(12) United States Patent
Cho et al.

(10) Patent No.: US 12,498,550 B2
(45) Date of Patent: Dec. 16, 2025

(54) IMAGING LENS SYSTEM (71) Applicant: SAMSUNG ELECTRONICS CO., LTD., Suwon-si (KR)

(72) Inventors: Yongsik Cho, Suwon-si (KR); Seung Hak Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 787 days.

(21) Appl. No.: 17/752,431

(22) Filed: May 24, 2022

(65) Prior Publication Data

US 2023/0075344 A1   Mar. 9, 2023

(30) Foreign Application Priority Data

Aug. 31, 2021   (KR) .......................... 10-2021-0115614

(51) Int. Cl.
*G02B 17/08* (2006.01)
*G02B 13/00* (2006.01)

(52) U.S. Cl.
CPC ..... *G02B 17/0808* (2013.01); *G02B 13/0045* (2013.01); *G02B 17/0856* (2013.01)

(58) Field of Classification Search
CPC ............ G02B 17/0808; G02B 13/0045; G02B 17/0856; G02B 17/0804; G02B 26/0816
See application file for complete search history.

(56) References Cited

U.S. PATENT DOCUMENTS

| | | | | |
|---|---|---|---|---|
| 4,666,259 A | * | 5/1987 | Lizuka | G02B 17/0884 359/731 |
| 5,331,467 A | * | 7/1994 | Sato | G02B 17/0856 359/557 |
| 8,680,450 B2 | * | 3/2014 | Pritchard | F41G 7/2246 343/705 |
| 8,767,318 B2 | | 7/2014 | Hatakeyama | |
| 8,896,938 B2 | | 11/2014 | Hatakeyama | |
| 9,557,627 B2 | | 1/2017 | Mercado | |
| 10,133,043 B1 | | 11/2018 | Lu | |
| 10,310,222 B2 | | 6/2019 | Yao et al. | |

(Continued)

FOREIGN PATENT DOCUMENTS

| | | |
|---|---|---|
| CN | 211061765 U | 7/2020 |
| JP | 5207121 B2 | 6/2013 |

(Continued)

*Primary Examiner* — Jia X Pan
(74) *Attorney, Agent, or Firm* — Sughrue Mion, PLLC (57) ABSTRACT

Provided is an imaging lens system including a first lens having a positive refractive power, an image-side surface of the first lens is concave, a first reflecting member disposed adjacent to the first lens, an object-side surface of the first reflecting member is concave, a second lens having a negative refractive power, an image-side surface of the second lens is concave, a third lens disposed adjacent to the image-side surface of the second lens, a second reflecting member disposed adjacent to the second lens or the third lens, an image-side surface of the second reflecting member having a convex shape, and an image sensor, wherein the first lens, the second lens and the third lens are sequentially disposed from a side of an object toward the image sensor, and wherein the object-side surface of the first reflecting member and the image-side surface of the second reflecting member include reflective surfaces.

20 Claims, 8 Drawing Sheets

(56) References Cited

U.S. PATENT DOCUMENTS

| | | | |
|---|---|---|---|
| 10,670,827 B2 | 6/2020 | Shabtay et al. | |
| 10,877,354 B2 | 12/2020 | Cahall et al. | |
| 2014/0049841 A1* | 2/2014 | Ryu | G02B 13/02 |
| | | | 359/745 |
| 2019/0265449 A1* | 8/2019 | Cho | G02B 27/0025 |
| 2020/0041773 A1 | 2/2020 | Kim et al. | |
| 2020/0348512 A1 | 11/2020 | Huang et al. | |
| 2021/0141240 A1* | 5/2021 | Watanabe | G02B 17/08 |

FOREIGN PATENT DOCUMENTS

| | | | | |
|---|---|---|---|---|
| JP | 6308208 B2 | 4/2018 | | |
| KR | 20090045682 A1 * | 5/2009 | | |
| WO | WO-2012108137 A1 * | 8/2012 | | G02B 17/0808 |

* cited by examiner

IMAGING LENS SYSTEM

CROSS-REFERENCE TO RELATED APPLICATIONS

This U.S. non-provisional patent application claims priority under 35 U.S.C. § 119 to Korean Patent Application No. 10-2021-0115614, filed on Aug. 31, 2021, in the Korean Intellectual Property Office, the entirety of which is hereby incorporated by reference.

BACKGROUND

The present disclosure relates to an imaging lens system capable of obtaining an image of an object (or subject) and an electronic device including the same.

As sizes of image devices have been reduced and the numbers of pixels of the image sensors have been increased, small and high optical performance imaging lenses installed in electronic devices have been increasingly demanded. In particular, imaging lenses used in small electronic devices (e.g., portable phones) may be required to have small sizes and high magnification properties to obtain an image of a subject located at a long distance.

SUMMARY

One or more example embodiments provide an imaging lens system which has a small size and is configured to realize a high magnification, and an electronic device including the same.

According to an aspect of an example embodiment, there is provided an imaging lens system including a first lens having a positive refractive power, an image-side surface of the first lens is concave, a first reflecting member disposed adjacent to the first lens, an object-side surface of the first reflecting member is concave, a second lens having a negative refractive power, an image-side surface of the second lens is concave, a third lens disposed adjacent to the image-side surface of the second lens, a second reflecting member disposed adjacent to the second lens or the third lens, an image-side surface of the second reflecting member having a convex shape, and an image sensor, wherein the first lens, the second lens and the third lens are sequentially disposed from a side of an object toward the image sensor, and wherein the object-side surface of the first reflecting member and the image-side surface of the second reflecting member include reflective surfaces.

According to another aspect of an example embodiment, there is provided an imaging lens system including a first lens having an image-side surface that is concave, a first reflecting member disposed adjacent to the first lens, an object-side surface of the first reflecting member is concave, a second lens having an image-side surface that is concave, a third lens having an image-side surface that is concave, a second reflecting member disposed adjacent to the second lens or the third lens, an image-side surface of the second reflecting member is convex, and an image sensor, wherein the first lens, the second lens and the third lens are sequentially disposed from a side of an object toward the image sensor, and wherein the object-side surface of the first reflecting member and the image-side surface of the second reflecting member include reflective surfaces.

BRIEF DESCRIPTION OF THE DRAWINGS

Example embodiments of the present disclosure will be more clearly understood from the following detailed description taken in conjunction with the accompanying drawings in which.

DETAILED DESCRIPTION

Example embodiments will now be described more fully with reference to the accompanying drawings.

Figure 1:
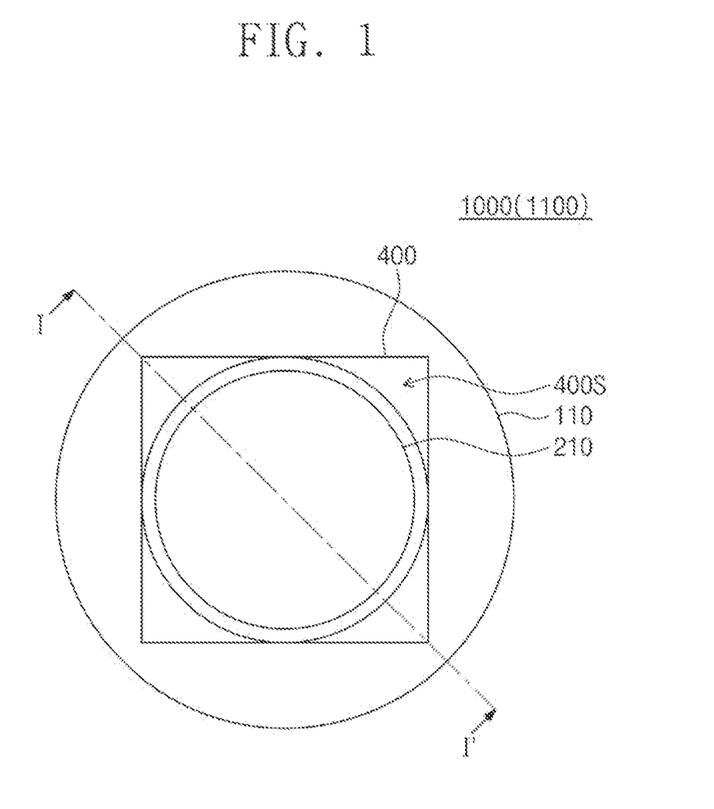
FIG. 1 is a front view illustrating an imaging lens system according to example embodiments.
Figure 2:
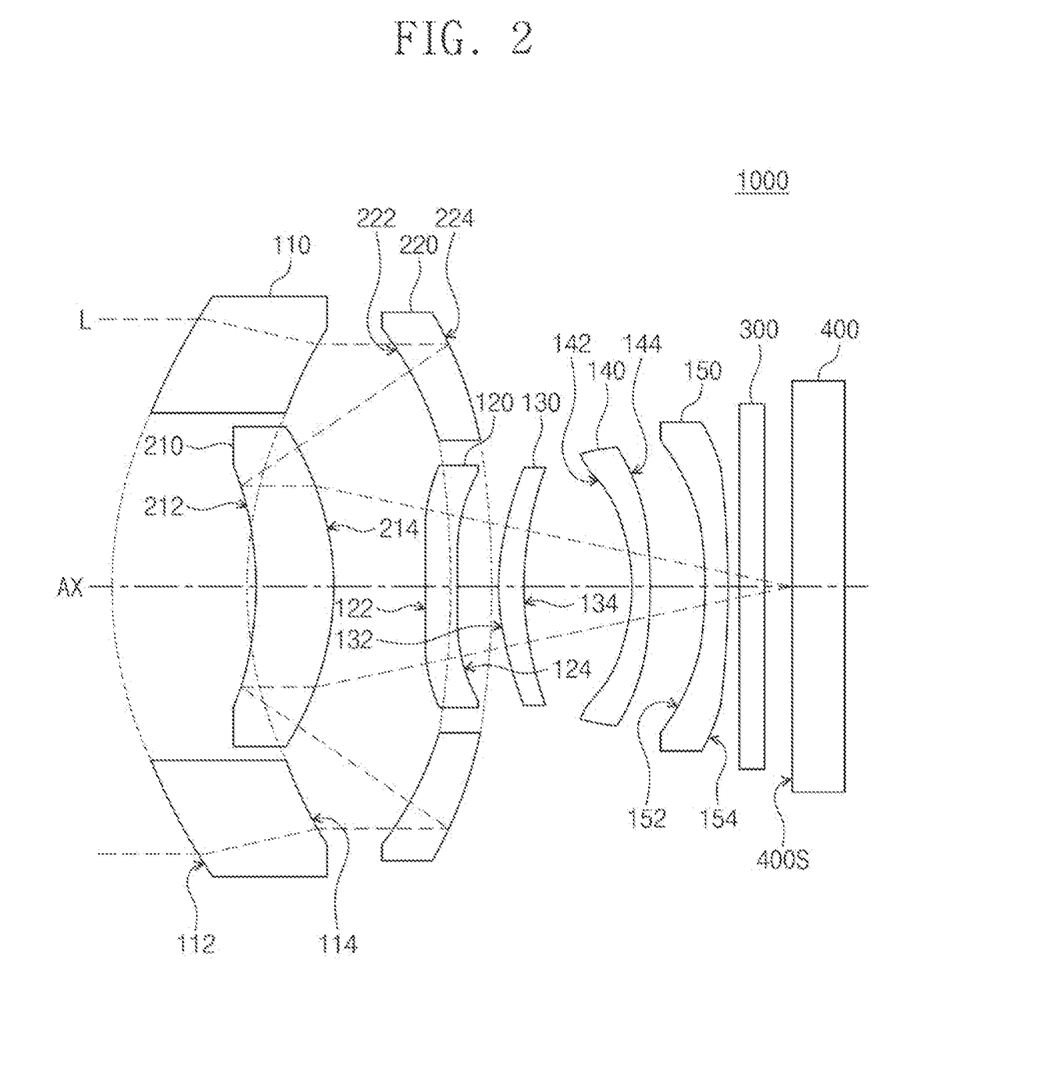
FIG. 2 is a side view taken along a line I-I' of FIG. 1 to illustrate an imaging lens system according to example embodiments.
Figure 3:
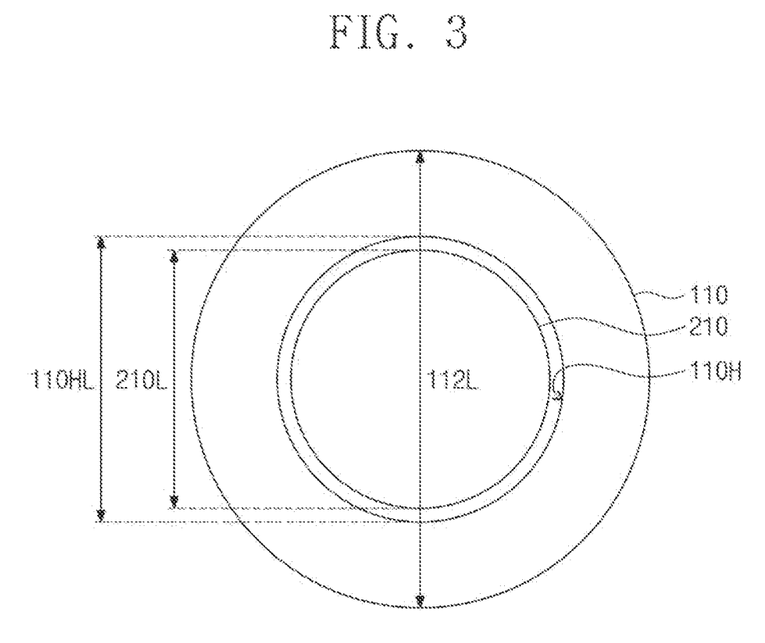
FIG. 3 is a front view illustrating arrangement of a first lens and a first reflecting member of FIG. 2.
Figure 4:
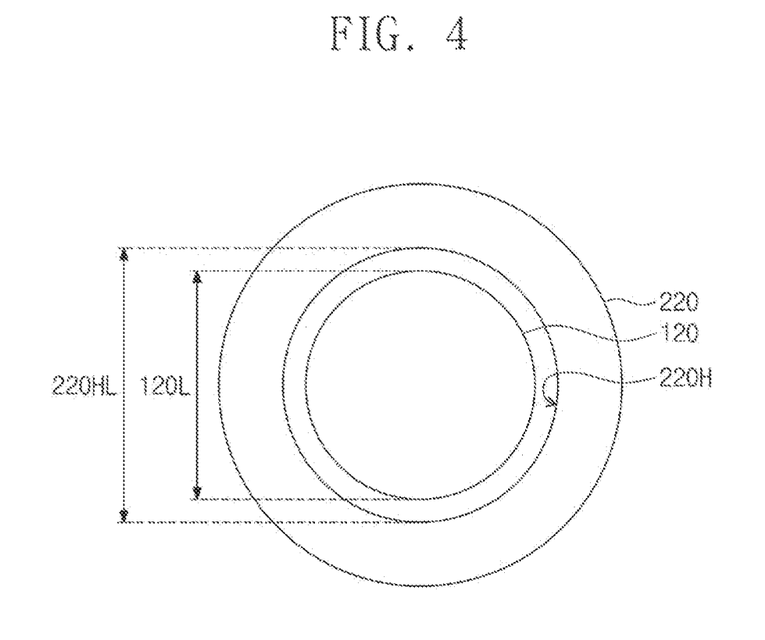
FIG. 4 is a front view illustrating arrangement of a second lens and a second reflecting member of FIG. 2.
Figure 5:
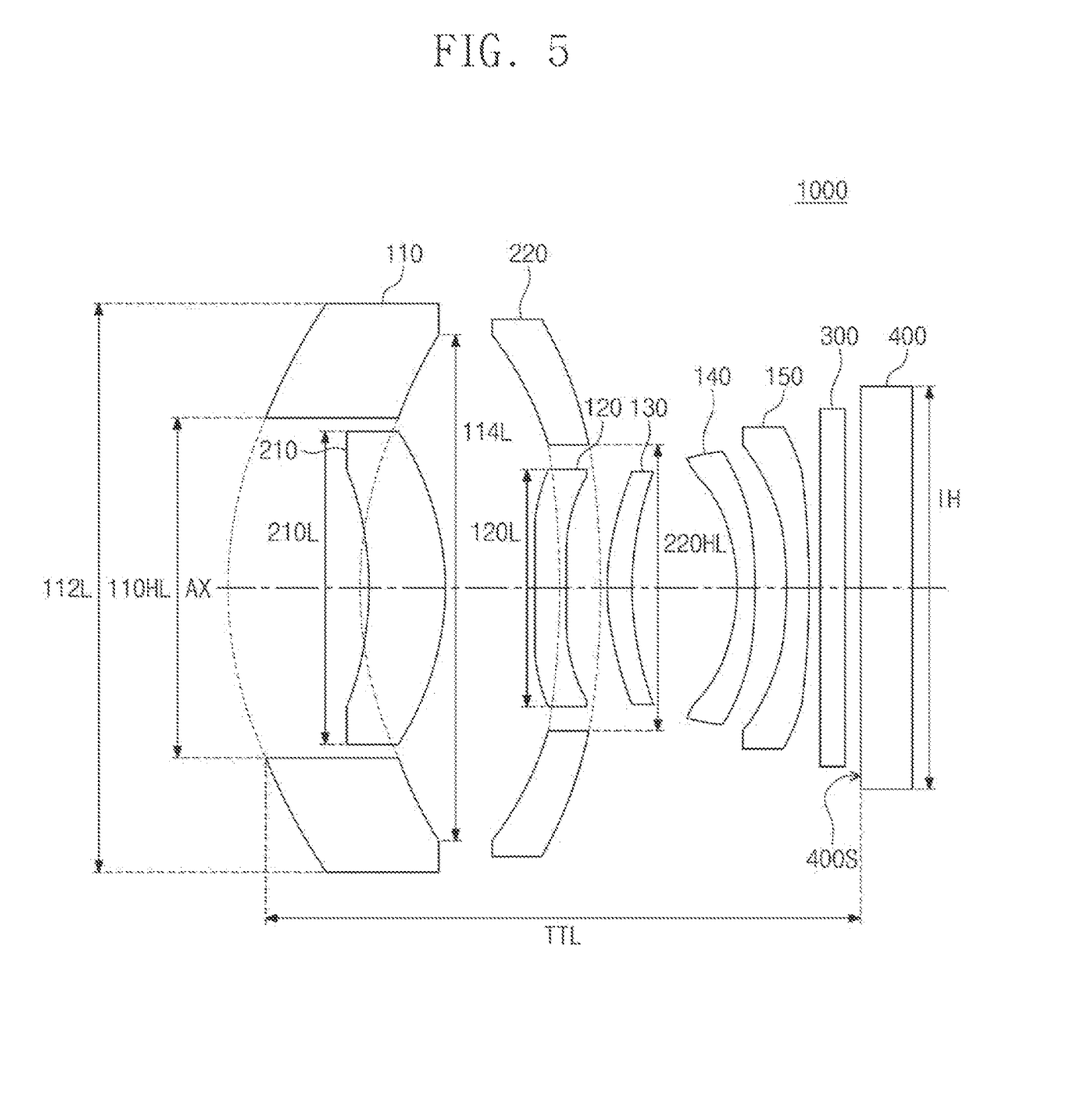
FIG. 5 is a view illustrating dimensions of lenses and reflecting members constituting the imaging lens system of FIG. 2.

FIG. 1 is a front view illustrating an imaging lens system according to example embodiments. FIG. 2 is a side view taken along a line I-I' of FIG. 1 to illustrate an imaging lens system according to example embodiments. FIG. 3 is a front view illustrating arrangement of a first lens 110 and a first reflecting member 210 (a first reflecting device) of FIG. 2, and FIG. 4 is a front view illustrating arrangement of a second lens 120 and a second reflecting member 220 (a second reflecting device) of FIG. 2. FIG. 5 is a view illustrating dimensions of lenses and reflecting members constituting the imaging lens system of FIG. 2.

Referring to FIGS. 1 and 2, an imaging lens system 1000 may include a plurality of lenses 110, 120, 130, 140 and 150, a plurality of reflecting members 210 and 220, a filter 300, and an image sensor 400. The image sensor 400 may provide an image surface 400S on which light L incident through the plurality of lenses 110, 120, 130, 140 and 150, the plurality of reflecting members 210 and 220 and the filter 300 may be imaged. The plurality of lenses 110, 120, 130, 140 and 150 may include a first lens 110, a second lens 120, a third lens 130, a fourth lens 140 and a fifth lens 150, which are sequentially disposed from an object (or subject) side toward the image surface 400S of the image sensor 400. The plurality of reflecting members 210 and 220 may include a first reflecting member 210 and a second reflecting member 220, which are sequentially disposed from the object (or subject) side toward the image surface 400S of the image sensor 400.

The first lens 110 may have a positive refractive power. The first lens 110 may have an object-side surface 112 and an image-side surface 114, which are opposite to each other. The object-side surface 112 of the first lens 110 may face the object (or subject), and the image-side surface 114 of the first lens 110 may face the image surface 400S of the image sensor 400. The image-side surface 114 of the first lens 110 may be concave. For example, the object-side surface 112 of the first lens 110 may be convex and the image-side surface 114 of the first lens 110 may be concave. The first lens 110 may be a spherical lens or an aspherical lens. The object-side surface 112 and the image-side surface 114 of the first lens 110 may be spherical surfaces when the first lens 110 is the spherical lens, and the object-side surface 112 and the image-side surface 114 of the first lens 110 may be aspherical surfaces when the first lens 110 is the aspherical lens. The first lens 110 may be formed of, for example, a glass or plastic material.

The first reflecting member 210 may be disposed adjacent to the first lens 110. The first reflecting member 210 may have an object-side surface 212 and an image-side surface 214, which are opposite to each other. The object-side surface 212 of the first reflecting member 210 may face the object (or subject), and the image-side surface 214 of the first reflecting member 210 may face the image surface 400S of the image sensor 400. The object-side surface 212 of the first reflecting member 210 may be concave. For example, the object-side surface 212 of the first reflecting member 210 may be concave and the image-side surface 214 of the first reflecting member 210 may be convex. The object-side surface 212 of the first reflecting member 210 may include a reflective surface. The object-side surface 212 of the first reflecting member 210 may be configured to reflect light incident from the image-side surface 214 of the first reflecting member 210 to the second lens 120. The first reflecting member 210 may be an aspherical lens, and the object-side surface 212 and the image-side surface 214 of the first reflecting member 210 may be aspherical surfaces. The first reflecting member 210 may be formed of, for example, a plastic material.

Referring to FIGS. 2 and 3, the first lens 110 may have a first hole 110H penetrating a central portion of the first lens 110, and may have a ring shape when viewed in a direction parallel to the optical axis AX. The first reflecting member 210 may overlap with the first hole 110H of the first lens 110 in a direction parallel to an optical axis AX of the imaging lens system 1000. The first reflecting member 210 may entirely overlap with the first hole 110H in the direction parallel to the optical axis AX, and, for example, the first reflecting member 210 may be disposed in the first hole 110H.

Referring again to FIGS. 1 and 2, the second lens 120 may have a negative refractive power. The second lens 120 may have an object-side surface 122 and an image-side surface 124, which are opposite to each other. The object-side surface 122 of the second lens 120 may face the object (or subject), and the image-side surface 124 of the second lens 120 may face the image surface 400S of the image sensor 400. The image-side surface 124 of the second lens 120 may be concave. For example, the object-side surface 122 of the second lens 120 may be convex and the image-side surface 124 of the second lens 120 may be concave. The second lens 120 may be an aspherical lens, and the object-side surface 122 and the image-side surface 124 of the second lens 120 may be aspherical surfaces. The second lens 120 may be formed of, for example, a plastic material.

In example embodiments, the second reflecting member 220 may be disposed adjacent to the second lens 120. The second reflecting member 220 may have an object-side surface 222 and an image-side surface 224, which are opposite to each other. The object-side surface 222 of the second reflecting member 220 may face the object (or subject), and the image-side surface 224 of the second reflecting member 220 may face the image surface 400S of the image sensor 400. The image-side surface 224 of the second reflecting member 220 may be convex. For example, the object-side surface 222 of the second reflecting member 220 may be concave and the image-side surface 224 of the second reflecting member 220 may be convex. The image-side surface 224 of the second reflecting member 220 may include a reflective surface. The image-side surface 224 of the second reflecting member 220 may be configured to reflect light incident from the object-side surface 222 of the second reflecting member 220 to the first reflecting member 210. The second reflecting member 220 may be an aspherical lens, and the object-side surface 222 and the image-side surface 224 of the second reflecting member 220 may be aspherical surfaces. The second reflecting member 220 may be formed of, for example, a plastic material.

Referring to FIGS. 2 and 4, the second reflecting member 220 may have a second hole 220H penetrating a central portion of the second reflecting member 220 and may have a ring shape. The second lens 120 may overlap with the second hole 220H of the second reflecting member 220 in the direction parallel to the optical axis AX. The second lens 120 may entirely overlap with the second hole 220H in the direction parallel to the optical axis AX. For example, the second lens 120 may be disposed in the second hole 220H.

Referring again to FIGS. 1 and 2, the third lens 130 may have a negative refractive power. The third lens 130 may have an object-side surface 132 and an image-side surface 134, which are opposite to each other. The object-side surface 132 of the third lens 130 may face the object (or subject), and the image-side surface 134 of the third lens 130 may face the image surface 400S of the image sensor 400. The image-side surface 134 of the third lens 130 may be concave. For example, the object-side surface 132 of the third lens 130 may be convex and the image-side surface 134 of the third lens 130 may be concave. The third lens 130 may be an aspherical lens, and the object-side surface 132 and the image-side surface 134 of the third lens 130 may be aspherical surfaces. The third lens 130 may be formed of, for example, a plastic material.

The fourth lens 140 may have a positive refractive power. The fourth lens 140 may have an object-side surface 142 and an image-side surface 144, which are opposite to each other. The object-side surface 142 of the fourth lens 140 may face the object (or subject), and the image-side surface 144 of the fourth lens 140 may face the image surface 400S of the image sensor 400. The the image-side surface 144 of the fourth lens 140 may be convex. For example, the object-side surface 142 of the fourth lens 140 may be concave and the image-side surface 144 of the fourth lens may be convex. The fourth lens 140 may be an aspherical lens, and the object-side surface 142 and the image-side surface 144 of the fourth lens 140 may be aspherical surfaces. The fourth lens 140 may be formed of, for example, a plastic material.

The fifth lens 150 may have a negative refractive power. The fifth lens 150 may have an object-side surface 152 and an image-side surface 154, which are opposite to each other. The object-side surface 152 of the fifth lens 150 may face the object (or subject), and the image-side surface 154 of the fifth lens 150 may face the image surface 400S of the image sensor 400. The image-side surface 154 of the fifth lens 150 may be convex. For example, the object-side surface 152 of the fifth lens 150 may be concave and the image-side surface 154 of the fifth lens 150 may be convex. The fifth lens 150 may be an aspherical lens, and the object-side surface 152 and the image-side surface 154 of the fifth lens 150 may be aspherical surfaces. The fifth lens 150 may be formed of, for example, a plastic material.

The filter 300 may be disposed between the fifth lens 150 and the image surface 400S of the image sensor 400. The filter 300 may block a portion of light L, of certain wavelengths, incident through the first to fifth lenses 110, 120, 130, 140 and 150 and the first and second reflecting members 210 and 220. For example, the filter 300 may be an infrared filter for blocking infrared light of the incident light L.

The image sensor 400 may include a plurality of pixels for converting the incident light L incident through the first to fifth lenses 110, 120, 130, 140 and 150, the first and second reflecting members 210 and 220 and the filter 300 into electrical signals.

The imaging lens system 1000 may be configured to increase an optical path of the incident light L incident to the imaging lens system 1000 without increasing a total length of the imaging lens system 1000. For example, the incident light L incident from the outside may be incident to the object-side surface 222 of the second reflecting member 220 through the first lens 110 and then may be reflected at the image-side surface 224 of the second reflecting member 220 to be incident to the image-side surface 214 of the first reflecting member 210. The incident light L may be reflected at the object-side surface 212 of the first reflecting member 210 to be incident to the second lens 120 and then may be incident to the image surface 400S of the image sensor 400 through the third to fifth lenses 130, 140 and 150 and the filter 300.

Referring to FIGS. 2 and 5, an effective diameter 112L of the object-side surface 112 of the first lens 110 may be greater than an effective diameter 114L of the image-side surface 114 of the first lens 110. In the present disclosure, an effective diameter may indicate a diameter of a lens (or a reflecting member) through which light actually passes. The first lens 110 may have the greatest effective diameter in the imaging lens system 1000. For example, the effective diameter 112L of the object-side surface 112 of the first lens 110 may be greater than an effective diameter of each of the second to fifth lenses 120, 130, 140 and 150 and the first and second reflecting members 210 and 220. The effective diameter 112L of the object-side surface 112 of the first lens 110 may range from 0.8 times to 3 times a diagonal length IH of the image surface 400S of the image sensor 400 (i.e., $0.8IH \leq 112L \leq 3IH$). For example, the effective diameter 112L of the object-side surface 112 of the first lens 110 may be greater than 0.8 times the diagonal length IH of the image surface 400S and may be less than 3 times the diagonal length IH of the image surface 400S (i.e., $0.8IH < 112L < 3IH$). The first lens 110 may function as an aperture in the imaging lens system 1000. The first lens 110 may have a size (e.g., a diameter) greater than that of each of the second to fifth lenses 120, 130, 140 and 150 and the first and second reflecting members 210 and 220.

Referring to FIGS. 2, 3 and 5, a diameter 110HL of the first hole 110H of the first lens 110 may be greater than a diameter 210L of the first reflecting member 210. Thus, the first reflecting member 210 may be disposed in the first hole 110H. In example embodiments, an effective diameter of the object-side surface 212 of the first reflecting member 210 may be less than an effective diameter of the image-side surface 214 of the first reflecting member 210.

Referring to FIGS. 2, 4 and 5, an effective diameter of the object-side surface 222 of the second reflecting member 220 may be less than an effective diameter of the image-side surface 224 of the second reflecting member 220. A diameter 220HL of the second hole 220H of the second reflecting member 220 may be greater than a diameter 120L of the second lens 120. Thus, the second lens 120 may be disposed in the second hole 220H. An effective diameter of the object-side surface 122 of the second lens 120 may be greater than an effective diameter of the image-side surface 124 of the second lens 120.

Referring again to FIGS. 2 and 5, in example embodiments, an effective diameter of the object-side surface 132 of the third lens 130 may be less than an effective diameter of the image-side surface 134 of the third lens 130. An effective diameter of the object-side surface 142 of the fourth lens 140 may be less than an effective diameter of the image-side surface 144 of the fourth lens 140, and an effective diameter of the object-side surface 152 of the fifth lens 150 may be less than an effective diameter of the image-side surface 154 of the fifth lens 150.

The imaging lens system 1000 may be configured to satisfy at least one of the following conditions.

$$-10 < f1/f2 < -3$$

$$-30 < f5/f < 0$$

Here, 'f' is a total effective focal length of the imaging lens system 1000, 'f1' is an effective focal length of the first lens 110, 'f2' is an effective focal length of the second lens 120, and 'f5' is an effective focal length of the fifth lens 150.

The imaging lens system 1000 may be configured to satisfy the following condition.

$$1 < f/TTL < 3$$

Here, 'f' is the total effective focal length of the imaging lens system 1000, and 'TTL' is a distance from the object-side surface 112 of the first lens 110 to the image surface 400S of the image sensor 400 and is a distance on the optical axis AX.

The imaging lens system 1000 may be configured to realize autofocus by moving all of the first to fifth lenses 110, 120, 130, 140 and 150 and the first and second reflecting members 210 and 220. For example, the imaging lens system 1000 may realize the autofocus by moving all of the first to fifth lenses 110, 120, 130, 140 and 150 and the first and second reflecting members 210 and 220 in the direction parallel to the optical axis AX.

The following Table 1 shows example dimensions of the imaging lens system 1000 according to example embodiments. In the Table 1, surface numbers are reference numerals indicating the object-side surfaces and the image-side surfaces of the first to fifth lenses 110, 120, 130, 140 and 150 and the first and second reflecting members 210 and 220, illustrated in FIG. 2. In Table 1, '110HL' is the diameter of the first hole 110H of the first lens 110 illustrated in FIGS. 3 and 5, '220HL' is the diameter of the second hole 220H of the second reflecting member 220 illustrated in FIGS. 4 and 5, and 'IH' is the diagonal length of the image surface 400S of the image sensor 400 illustrated in FIG. 5.

TABLE 1

| Surface number | Effective diameter (mm) | Surface number | Effective diameter (mm) |
|---|---|---|---|
| 112 | 8.692 | 212 | 3.635 |
| 114 | 7.784 | 214 | 4.8 |
| 122 | 3.6 | 222 | 7.766 |
| 124 | 3.406 | 224 | 8.204 |
| 132 | 3.491 | 110HL | = 5.2 mm |
| 134 | 3.522 | 220HL | = 4.4 mm |
| 142 | 3.865 | IH | = 5.76 mm |
| 144 | 4.342 | | |

TABLE 1-continued

| Surface number | Effective diameter (mm) | Surface number | Effective diameter (mm) |
|---|---|---|---|
| 152 | 4.382 | | |
| 154 | 4.946 | | |

When the imaging lens system 1000 is formed based on the parameters as shows in Table 1, the total effective focal length f of the imaging lens system 1000 is 16.65 mm, the total length TTL of the imaging lens system 1000 is 7.8 mm, and a f-number is 2.4.

Figure 6:
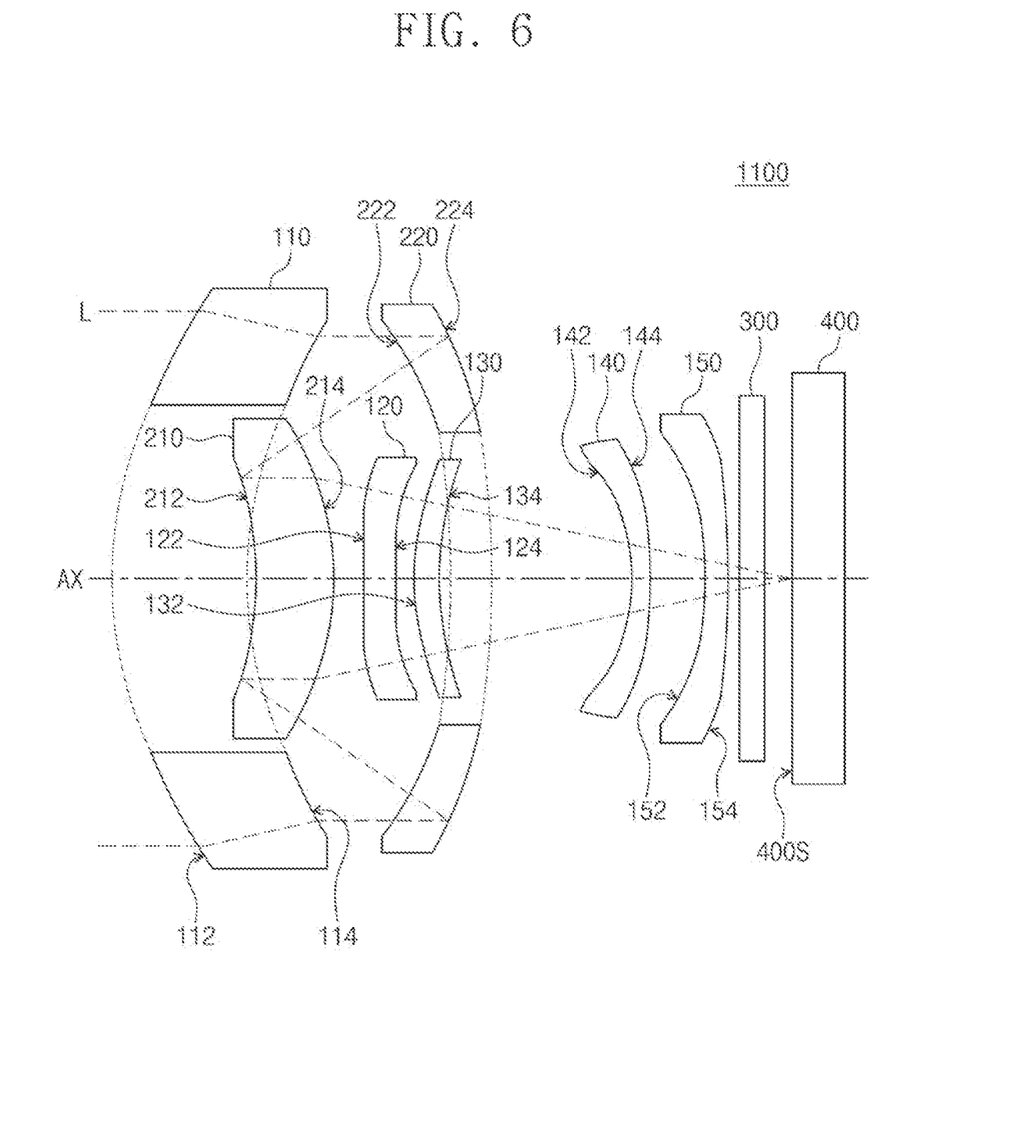
FIG. 6 is a side view taken along the line I-I' of FIG. 1 to illustrate an imaging lens system according to example embodiments.
Figure 7:
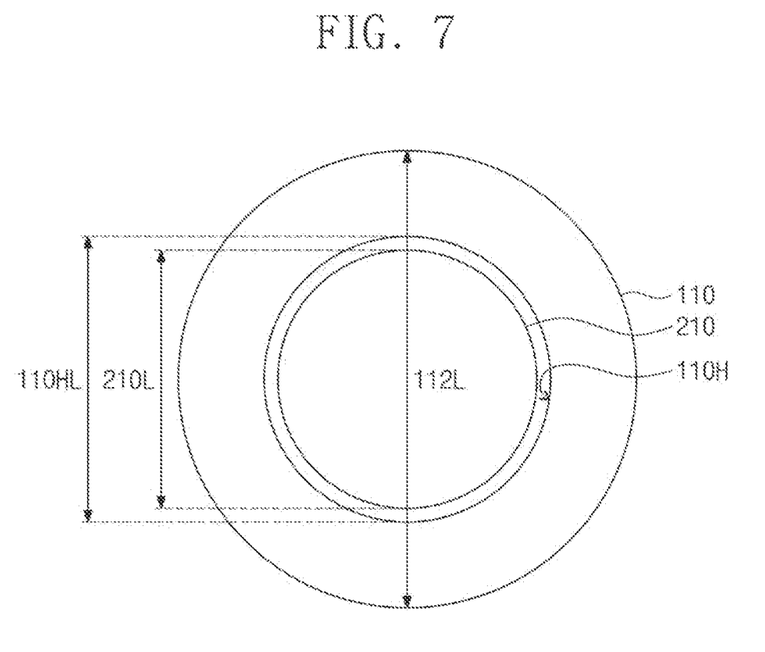
FIG. 7 is a front view illustrating arrangement of a first lens and a first reflecting member of FIG. 6.
Figure 8:
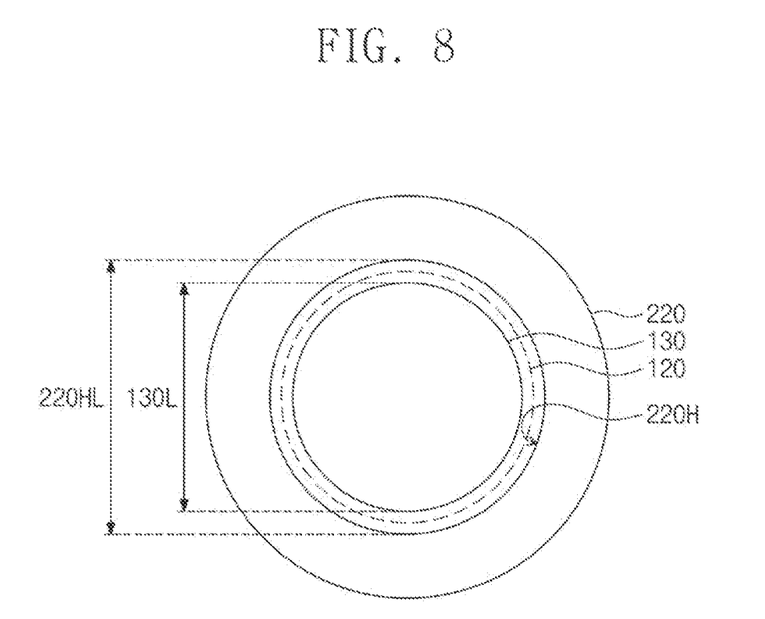
FIG. 8 is a front view illustrating arrangement of second and third lenses and a second reflecting member of FIG. 6.
Figure 9:
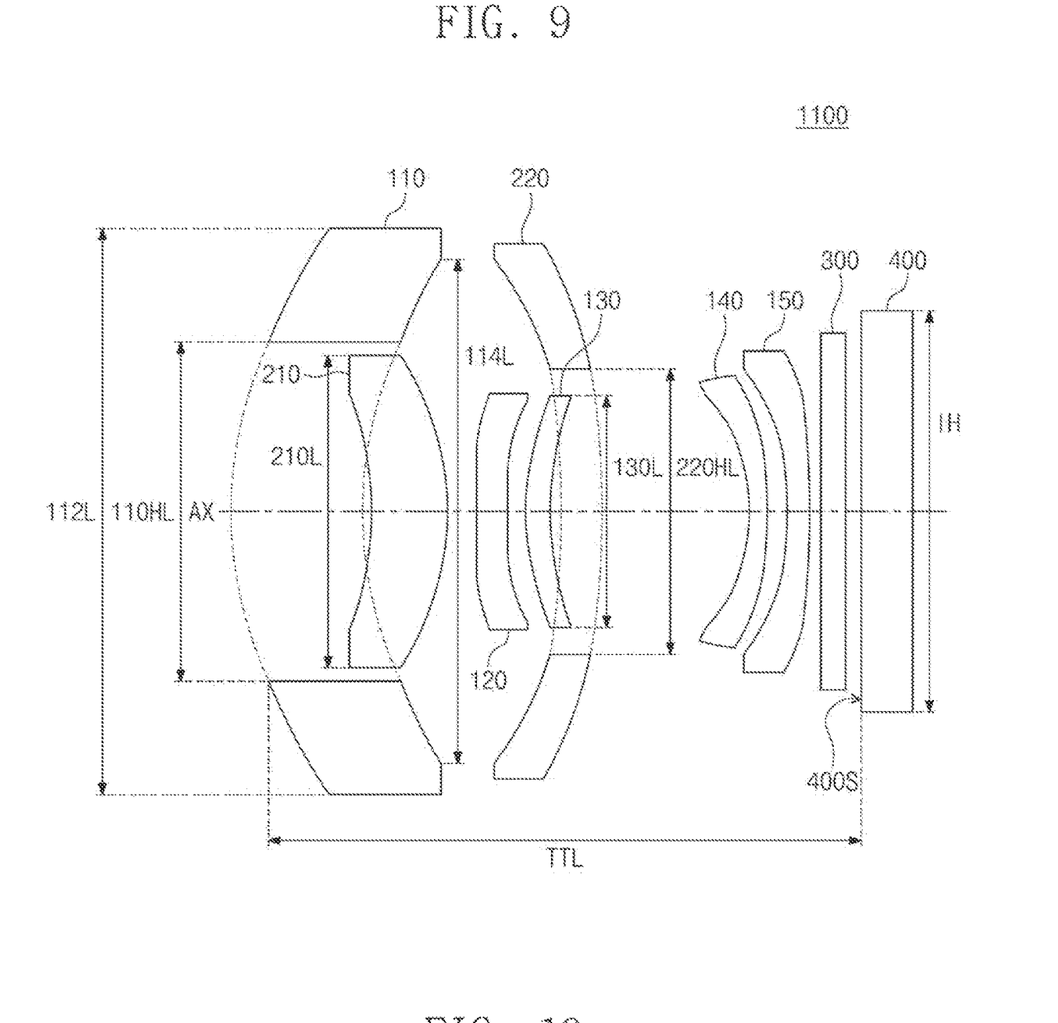
FIG. 9 is a view illustrating dimensions of lenses and reflecting members constituting the imaging lens system of FIG. 6.

FIG. 6 is a side view taken along the line I-I' of FIG. 1 to illustrate an imaging lens system according to example embodiments. FIG. 7 is a front view illustrating arrangement of a first lens 110 and a first reflecting member 210 of FIG. 6, and FIG. 8 is a front view illustrating arrangement of second and third lenses 120 and 130 and a second reflecting member 220 of FIG. 6. FIG. 9 is a view illustrating dimensions of lenses and reflecting members constituting the imaging lens system of FIG. 6. Hereinafter, the descriptions to the same features as in the imaging lens system 1000 described with reference to FIGS. 1 to 5 will be omitted for the purpose of ease and convenience in explanation.

Referring to FIGS. 1 and 6, an imaging lens system 1100 may include the plurality of lenses 110, 120, 130, 140 and 150, the plurality of reflecting members 210 and 220, the filter 300, and the image sensor 400.

Referring to FIGS. 6 and 7, the first lens 110 may have a first hole 110H penetrating a central portion of the first lens 110, and may have a ring shape. The first reflecting member 210 may overlap with the first hole 110H of the first lens 110 in a direction parallel to an optical axis AX of the imaging lens system 1100. The first reflecting member 210 may entirely overlap with the first hole 110H in the direction parallel to the optical axis AX. For example, the first reflecting member 210 may be disposed in the first hole 110H.

Referring to FIGS. 6 and 8, the second reflecting member 220 may have a second hole 220H penetrating a central portion of the second reflecting member 220, and may have a ring shape. In example embodiments, the second lens 120 may be disposed between the first reflecting member 210 and the second reflecting member 220. The second lens 120 may overlap with the second hole 220H of the second reflecting member 220 in the direction parallel to the optical axis AX. The third lens 130 may overlap with the second hole 220H of the second reflecting member 220 in the direction parallel to the optical axis AX. The third lens 130 may entirely overlap with the second hole 220H in the direction parallel to the optical axis AX. For example, the third lens 130 may be disposed in the second hole 220H.

Referring to FIGS. 6 and 9, an effective diameter 112L of the object-side surface 112 of the first lens 110 may be greater than an effective diameter 114L of the image-side surface 114 of the first lens 110. The first lens 110 may have the greatest effective diameter in the imaging lens system 1100. For example, the effective diameter 112L of the object-side surface 112 of the first lens 110 may be greater than an effective diameter of each of the second to fifth lenses 120, 130, 140 and 150 and the first and second reflecting members 210 and 220. The effective diameter 112L of the object-side surface 112 of the first lens 110 may range from 0.8 times to 3 times a diagonal length IH of the image surface 400S of the image sensor 400 (i.e., $0.8IH \leq 112L \leq 3IH$). For example, the effective diameter 112L of the object-side surface 112 of the first lens 110 may be greater than 0.8 times the diagonal length IH of the image surface 400S of the image sensor 400 and may be less than 3 times the diagonal length IH of the image surface 400S of the image sensor 400 (i.e., $0.8IH < 112L < 3IH$). The first lens 110 may function as an aperture in the imaging lens system 1100. The first lens 110 may have a size (e.g., a diameter) greater than that of each of the second to fifth lenses 120, 130, 140 and 150 and the first and second reflecting members 210 and 220.

Referring to FIGS. 6, 7 and 9, a diameter 110HL of the first hole 110H of the first lens 110 may be greater than a diameter 210L of the first reflecting member 210. Thus, the first reflecting member 210 may be disposed in the first hole 110H. In example embodiments, an effective diameter of the object-side surface 212 of the first reflecting member 210 may be greater than an effective diameter of the image-side surface 214 of the first reflecting member 210.

Referring to FIGS. 6, 8 and 9, an effective diameter of the object-side surface 222 of the second reflecting member 220 may be less than an effective diameter of the image-side surface 224 of the second reflecting member 220. In example embodiments, a diameter 220HL of the second hole 220H of the second reflecting member 220 may be greater than a diameter 130L of the third lens 130. Thus, the third lens 130 may be disposed in the second hole 220H. An effective diameter of the object-side surface 122 of the second lens 120 may be greater than an effective diameter of the image-side surface 124 of the second lens 120, and an effective diameter of the object-side surface 132 of the third lens 130 may be greater than an effective diameter of the image-side surface 134 of the third lens 130.

Referring again to FIGS. 6 and 9, an effective diameter of the object-side surface 142 of the fourth lens 140 may be less than an effective diameter of the image-side surface 144 of the fourth lens 140, and an effective diameter of the object-side surface 152 of the fifth lens 150 may be less than an effective diameter of the image-side surface 154 of the fifth lens 150.

Other features of the imaging lens system 1100 according to the example embodiments may be substantially the same as corresponding features of the imaging lens system 1000 described with reference to FIGS. 1 to 5.

The following Table 2 shows example dimensions of the imaging lens system 1100 according to example embodiments. In the Table 2, surface numbers are reference numerals indicating the object-side surfaces and the image-side surfaces of the first to fifth lenses 110, 120, 130, 140 and 150 and the first and second reflecting members 210 and 220, illustrated in FIG. 6. In the Table 2, '110HL' is the diameter of the first hole 110H of the first lens 110 illustrated in FIGS. 7 and 9, '220HL' is the diameter of the second hole 220H of the second reflecting member 220 illustrated in FIGS. 8 and 9, and 'IH' is the diagonal length of the image surface 400S of the image sensor 400 illustrated in FIG. 9.

TABLE 2

| Surface number | Effective diameter (mm) | Surface number | Effective diameter (mm) |
|---|---|---|---|
| 112 | 9.836 | 212 | 5.5 |
| 114 | 8.859 | 214 | 4.012 |
| 122 | 3.6 | 222 | 8.854 |
| 124 | 3.365 | 224 | 9.294 |
| 132 | 3.368 | | |

TABLE 2-continued

| Surface number | Effective diameter (mm) | Surface number | Effective diameter (mm) |
|---|---|---|---|
| 134 | 3.337 | 110HL | = 5.9 mm |
| 142 | 3.865 | 220HL | = 4.4 mm |
| 144 | 4.401 | IH | = 5.76 mm |
| 152 | 4.460 | | |
| 154 | 4.785 | | |

When the imaging lens system 1100 is formed based on the parameters as shown in Table 2, a total effective focal length f of the imaging lens system 1100 is 16.65 mm, a total length TTL of the imaging lens system 1100 is 8.07 mm, and a f-number is 2.1.

According to the example embodiments, the imaging lens system 1000/1100 may be configured to increase the total effective focal length f while reducing the total length TTL. Thus, the imaging lens system 1000/1100 may have a relatively small size and may realize a high magnification.

Figure 10:
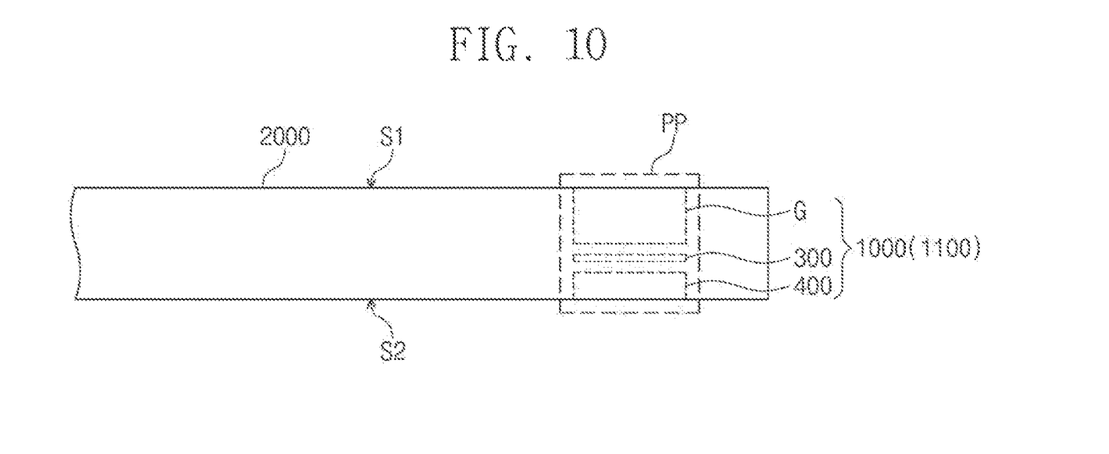
FIG. 10 is a side sectional view illustrating an electronic device including an imaging lens system according to example embodiments.
Figure 11:
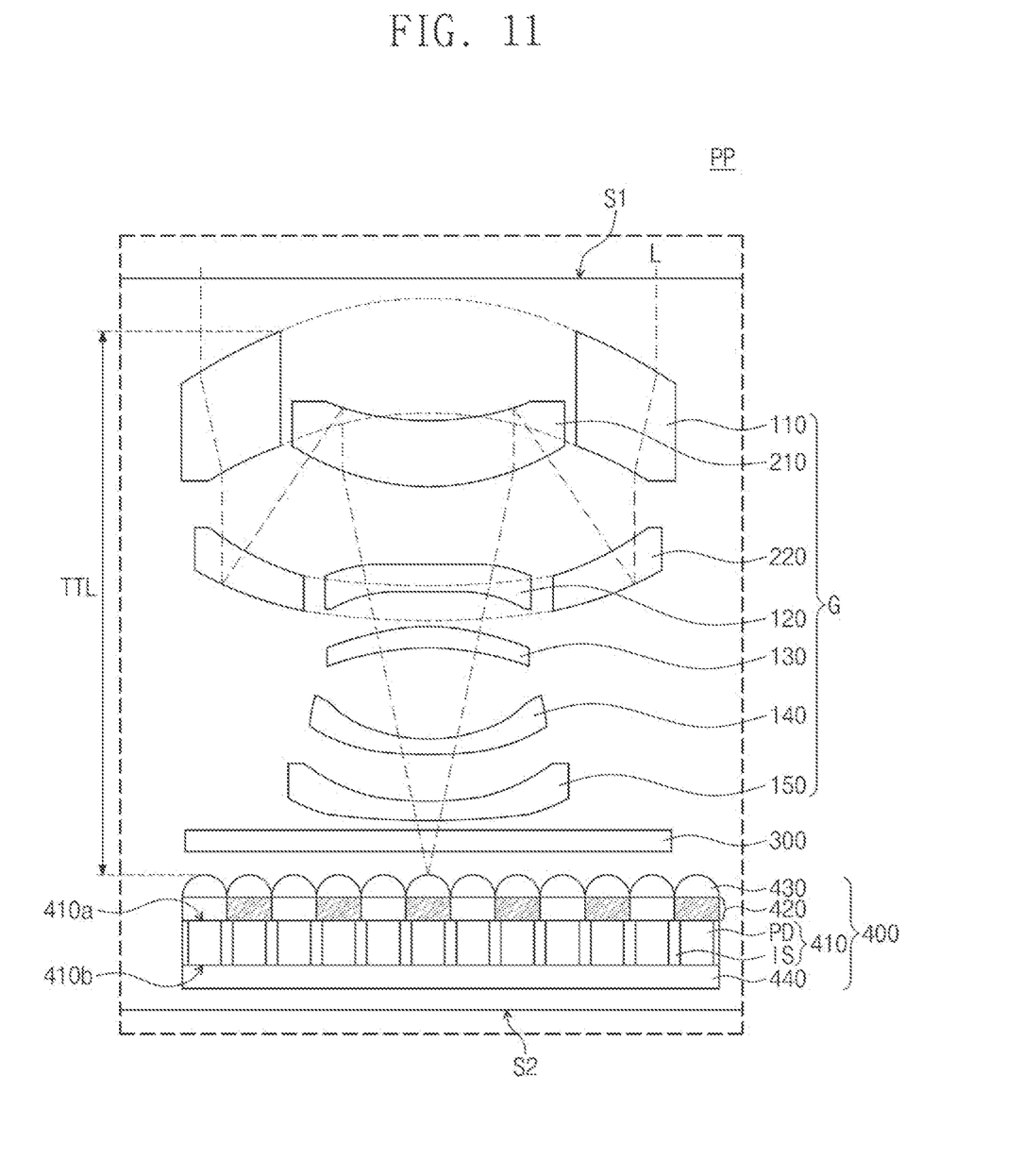
FIG. 11 is an enlarged view of a portion 'PP' of FIG. 10.

FIG. 10 is a side sectional view illustrating an electronic device including an imaging lens system according to example embodiments, and FIG. 11 is an enlarged view of a portion 'PP' of FIG. 10.

Referring to FIGS. 10 and 11, an electronic device 2000 may include an imaging lens system 1000/1100 according to example embodiments. For example, the electronic device 2000 may be a relatively small-sized electronic device such as a smart phone. The imaging lens system 1000/1100 may be disposed in the electronic device 2000. The electronic device 2000 may have a first surface S1 and a second surface S2, which are opposite to each other. The electronic device 2000 may have a length in a direction parallel to the first surface S1 and may have a thickness in a direction perpendicular to the first surface S1.

The imaging lens system 1000/1100 may include a lens group G including a plurality of lenses 110, 120, 130, 140 and 150 and a plurality of reflecting members 210 and 220, a filter 300, and an image sensor 400. The lens group G, the filter 300 and the image sensor 400 of the imaging lens system 1000/1100 may be sequentially disposed in the direction perpendicular to the first surface S1 of the electronic device 2000. For example, the lens group G may be disposed adjacent to the first surface S1 of the electronic device 2000, and the image sensor 400 may be disposed adjacent to the second surface S2 of the electronic device 2000. The filter 300 may be disposed between the lens group G and the image sensor 400.

The lens group G may include a first lens 110, a second lens 120, a third lens 130, a fourth lens 140 and a fifth lens 150, which are sequentially disposed from the first surface S1 toward the image sensor 400 in the direction perpendicular to the first surface S1 and may include a first reflecting member 210 and a second reflecting member 220, which are sequentially disposed from the first surface S1 toward the image sensor 400 in the direction perpendicular to the first surface S1. The first to fifth lenses 110, 120, 130, 140 and 150 and the first and second reflecting members 210 and 220 may be the same as the first to fifth lenses 110, 120, 130, 140 and 150 and the first and second reflecting members 210 and 220, described with reference to FIGS. 2 to 5 or may be the same as the first to fifth lenses 110, 120, 130, 140 and 150 and the first and second reflecting members 210 and 220, described with reference to FIGS. 6 to 9.

Incident light L incident from the outside may be incident to the lens group G of the imaging lens system 1000/1100 through the first surface S1 of the electronic device 2000. The incident light L may be incident to the image sensor 400 through the lens group G and the filter 300.

The filter 300 may block a portion of the incident light L, of certain wavelengths, incident through the first to fifth lenses 110, 120, 130, 140 and 150 and the first and second reflecting members 210 and 220. For example, the filter 300 may be an infrared filter that may block infrared light of the incident light L.

The image sensor 400 may include a plurality of pixels that may convert the incident light L incident through the lens group G and the filter 300 into electrical signals. For example, the image sensor 400 may include a substrate 410 including photoelectric conversion regions PD and device isolation patterns IS therebetween, a micro lens array 430 disposed on a top surface 410a of the substrate 410, a color filter array 420 between the top surface 410a of the substrate 410 and the micro lens array 430, and an interconnection layer 440 disposed on a bottom surface 410b of the substrate 410. Each of the plurality of pixels may include a corresponding one of the photoelectric conversion regions PD, a corresponding color filter of the color filter array 420, and a corresponding micro lens of the micro lens array 430. However, the structure of the image sensor 400 is not limited to the structure described above.

The imaging lens system 1000/1100 may be configured to realize autofocus by moving the whole of the lens group G in the direction perpendicular to the first surface S1. The imaging lens system 1000/1100 may be configured to increase a total effective focal length f while reducing a total length TTL.

The thickness (i.e., the thickness in the direction perpendicular to the first surface S1) of the electronic device 2000 may be less than the length (i.e., the length in the direction parallel to the first surface S1) of the electronic device 2000. The imaging lens system 1000/1100 may have a relatively reduced total length TTL For example, the total length TTL of the imaging lens system 1000/1100 may be less than about 10 mm, however, embodiments are not limited thereto. Thus, the imaging lens system 1000/1100 may be more easily mounted in the electronic device 2000 in a thickness direction (i.e., the direction perpendicular to the first surface S1) of the electronic device 2000. For example, the electronic device 2000 may be a smart phone.

According to example embodiments, the imaging lens system 1000/1100 may be configured to increase the total effective focal length f while reducing the total length TTL. Thus, the imaging lens system 1000/1100 may have a relatively small size and may realize a relatively high magnification. As a result, it is possible to provide the imaging lens system which has the relatively small size and is capable of realizing the relatively high magnification, and the electronic device including the same.

While example embodiments have been particularly shown and described, it will be understood by one of ordinary skill in the art that variations in form and detail may be made therein without departing from the spirit and scope of the attached claims and their equivalents.

What is claimed is:

1. An imaging lens system comprising:
    an image sensor;
    a first lens on the image sensor, the first lens having an image-side surface that is concave, the first lens having a first hole penetrating a central portion of the first lens;
    a first reflecting member disposed adjacent to the first lens;

a second reflecting member disposed between the first reflecting member and the image sensor;

a second lens disposed between the first reflecting member and the image sensor, wherein an object-side surface of the first reflecting member and an image-side surface of the second reflecting member include reflective surfaces, wherein the first lens, the first reflecting member and the second reflecting member are configured to satisfy:

$$1 < f/TTL < 3,$$

where, f is a total effective focal length of the imaging lens system, and TTL is a distance from an object-side surface of the first lens to an image surface of the image sensor, and wherein the second reflecting member has a second hole penetrating a central portion of the second reflecting member and at least a portion of the second lens is included in the second hole.

2. The imaging lens system of claim 1, wherein an effective diameter of the object-side surface of the first lens is greater than an effective diameter of an image-side surface of the first lens.

3. The imaging lens system of claim 1, wherein at least one of the first reflecting member or the second reflecting member is an aspherical lens.

4. The imaging lens system of claim 3, wherein the first lens is a spherical or aspherical lens.

5. The imaging lens system of claim 1, wherein an image-side surface of the first lens is concave.

6. The imaging lens system of claim 1, wherein the object-side surface of the first reflecting member is concave.

7. The imaging lens system of claim 1, wherein the image-side surface of the second reflecting member has a convex shape.

8. The imaging lens system of claim 1, wherein an effective diameter of the object-side surface of the first lens ranges from 0.8 times to 3 times a diagonal length of the image surface of the image sensor.

9. The imaging lens system of claim 1,
wherein the first reflecting member is disposed to overlap with the first hole in a direction parallel to an optical axis of the imaging lens system.

10. The imaging lens system of claim 1, wherein the distance from the object-side surface of the first lens to the image surface of the image sensor is less than 10 mm and greater than zero.

11. An imaging lens system comprising:
a first lens having a positive refractive power, an image-side surface of the first lens is concave, the first lens has a first hole penetrating a central portion of the first lens;
a first reflecting member disposed adjacent to the first lens, an object-side surface of the first reflecting member is concave;
a second lens having a negative refractive power, an image-side surface of the second lens is concave;
a third lens disposed adjacent to the image-side surface of the second lens;
a second reflecting member disposed adjacent to the second lens or the third lens, an image-side surface of the second reflecting member having a convex shape; and
an image sensor,
wherein the first lens, the second lens and the third lens are sequentially disposed from a side of an object toward the image sensor,
wherein the object-side surface of the first reflecting member and the image-side surface of the second reflecting member include reflective surfaces, and
wherein the second reflecting member has a second hole penetrating a central portion of the second reflecting member and at least a portion of the second lens or at least a portion of the third lens is included in the second hole.

12. The imaging lens system of claim 11, wherein the third lens has a negative refractive power and an image-side surface of the third lens is concave.

13. The imaging lens system of claim 12, further comprising:
a fourth lens and a fifth lens sequentially disposed between the third lens and the image sensor,
wherein the fourth lens has a positive refractive power and an image-side surface of the fourth lens is convex.

14. The imaging lens system of claim 13, wherein the fifth lens has a negative refractive power and an image-side surface of the fifth lens is convex.

15. An imaging lens system comprising:
a first lens having an image-side surface that is concave, the first lens has a first hole penetrating a central portion of the first lens;
a first reflecting member disposed adjacent to the first lens, an object-side surface of the first reflecting member is concave;
a second lens having an image-side surface that is concave;
a third lens having an image-side surface that is concave;
a second reflecting member disposed adjacent to the second lens or the third lens, an image-side surface of the second reflecting member is convex; and
an image sensor,
wherein the first lens, the second lens and the third lens are sequentially disposed from a side of an object toward the image sensor, and
wherein the object-side surface of the first reflecting member and the image-side surface of the second reflecting member include reflective surfaces, and
wherein the second reflecting member has a second hole penetrating a central portion of the second reflecting member and at least a portion of the second lens or at least a portion of the third lens is included in the second hole.

16. The imaging lens system of claim 15,
wherein the first reflecting member is disposed to overlap with the first hole in a direction parallel to an optical axis of the imaging lens system.

17. The imaging lens system of claim 15,
wherein the second lens or the third lens is disposed to overlap with the second hole in a direction parallel to an optical axis of the imaging lens system.

18. The imaging lens system of claim 15, further comprising:
a fourth lens and a fifth lens sequentially disposed between the third lens and the image sensor,
wherein an image-side surface of the fourth lens is convex, and an image-side surface of the fifth lens is convex.

19. The imaging lens system of claim 18, further comprising:
an infrared filter disposed between the fifth lens and the image sensor.

20. The imaging lens system of claim 15, wherein a distance from an object-side surface of the first lens to an image surface of the image sensor is less than 10 mm and greater than zero.

\* \* \* \* \*